US007748010B1

(12) United States Patent  
Cannata et al.

(10) Patent No.: US 7,748,010 B1
(45) Date of Patent: Jun. 29, 2010

(54) GLOBAL ATTRIBUTE UNIQUENESS (GAU) USING AN ORDERED MESSAGE SERVICE (OMS)

(75) Inventors: Philip Cannata, Austin, TX (US); Michael P. Dugan, Austin, TX (US); David S. Page, Austin, TX (US)

(73) Assignee: Oracle America, Inc., Redwood City, CA (US)

( * ) Notice: Subject to any disclaimer, the term of this patent is extended or adjusted under 35 U.S.C. 154(b) by 1217 days.

(21) Appl. No.: 11/300,931

(22) Filed: Dec. 15, 2005

(51) Int. Cl.
*G06F 3/00* (2006.01)
*G06F 17/30* (2006.01)
(52) U.S. Cl. ............... 719/316; 719/312; 707/202
(58) Field of Classification Search ............ 709/217
See application file for complete search history.

(56) References Cited

U.S. PATENT DOCUMENTS 7,286,990 B1 * 10/2007 Edmonds et al. ........... 704/275

2005/0102370 A1 * 5/2005 Lin et al. ............... 709/217

OTHER PUBLICATIONS

Sun, Administration Guide Sun One Directory Server, Version 5.2, Jun. 2003, Sun Microsystems, Inc, pp. 1-442.*

* cited by examiner

*Primary Examiner*—Hyung S Sough
*Assistant Examiner*—Tuan Dao
(74) *Attorney, Agent, or Firm*—Brooks Kushman P.C.

(57) ABSTRACT

A method and computer program product for providing Global Attribute Uniqueness (GAU) using an Ordered Message Service (OMS) is presented. A database operation is received from a client. A determination is made regarding whether the operation changes a value to a current value and when the operation would change a value to a current value then operation is ended. When the operation would not change a value to a current value the operation is decomposed into ADD messages and DELETE messages. The ADD messages are sent to a GAU manager and GAU state is checked and updated. The updates are committed to GAU state and the Directory Server (DS) is updated. Operation is then returned to the client. DELETE messages are sent to the GAU manager and GAU state is updated. The updates are then committed.

8 Claims, 7 Drawing Sheets

GLOBAL ATTRIBUTE UNIQUENESS (GAU) USING AN ORDERED MESSAGE SERVICE (OMS)

BACKGROUND

Group Communication Systems (GCSs) are powerful building blocks that facilitate the development of fault-tolerant distributed systems. Classical GCS applications include replication using a variant of the state machine/active replication approach, primary-backup replication, support for distributed and clustered operating systems, distributed transactions and database replication, resource allocation, load balancing, system management and highly available servers. More recently, GCSs have been exploited for collaborative computing including distance learning, drawing on a shared white board, video and audio conferences and even distributed musical jam sessions over a network. Currently, real-time GCSs are being exploited for real-time applications, for example, radar tracking.

GCSs can be used to provide highly available service, which are services that require maintaining a consistent shared state among numerous computers in order to guarantee high performance and availability. An example is using replicated databases. A number of instances of a database can exist in several different locations. The databases must all be kept synchronized in such a way that a client can query or update any of the databases and the results will be the same as if only a single copy of the database existed.

SUMMARY

Conventional mechanisms, such as those explained above, suffer from a variety of deficiencies. One problem in building distributed systems comes from the need to communicate and synchronize the different components of the system using networks that are prone to faults. In a distributed system (e.g. replicated databases or application server clusters) there are inherent uncertainties about the current state of remote components. Due to the complexity of such systems, the construction of a reliable and efficient distributed system is very difficult. GCS systems must maintain synchronization and timing between all the users of the system. This has proven difficult, especially when the use involves a global communication system with large number of remotely located users.

Embodiments of the invention significantly overcome such deficiencies and provide mechanisms and techniques that provide Global Attribute Uniqueness (GAU) using an Ordered Messaging Service (OMS) as part of the GCS. OMS provides fully ordered messages with delivery guarantees, even in case of computer failures and network partitions. In OMS, all receivers receive messages sent to the group in exactly the same order. For many document or message based applications this avoids a lot of engineering that used to be required for the application to order messages for usability or reliability reasons.

Global Attribute Uniqueness (GAU) enforces value uniqueness over a set of database servers for update operations that set the value of an attribute or set of attributes. GAU is a highly desirable feature of distributed data management systems, however GAU is difficult to implement due to the intrinsic complexity of building robust, distributed applications.

In a particular embodiment of a method for providing GAU using an Ordered Messaging Service (OMS), the method includes receiving a database operation from a client. A determination is made regarding whether the operation changes a value to a current value and when the operation would change a value to a current value, and then the operation is ended. When the operation would not change a value to a current value, then the operation is decomposed into ADD messages and DELETE messages. The ADD messages are sent to a GAU manager and GAU state is checked and updated. The updates are committed to GAU state and the Directory Server (DS) is updated. Operation is then returned to the client. DELETE messages are sent to the GAU manager and GAU state is updated. The updating of GAU state includes deletion of values from at least one GAU table, updating of the change log, and deletion of Fault Recovery Records from the at least one GAU table. The updates are then committed.

A method of synchronizing Directory Servers (DSs) performing Global Attribute Uniqueness (GAU) using an Ordered Messaging Service (OMS) after a DS has been disconnected from the group is also provided. This method includes receiving, at an OMS Manager in the DS that had been disconnected, a leader message from an OMS end-point queue indicating communications has been restored. The OMS Manager in the DS that had been disconnected provides a temporary group through which synchronization with a Leader DS in the main group will occur. The OMS Manager in the DS that had been disconnected sends a sync message to the OMS group. The OMS Manager in the DS that had been disconnected listens on the temporary group for sync messages. The OMS Manager of the elected Leader DS receives the sync message. The OMS Manager of the elected Leader DS sends blocks of change log records as sync messages to the temporary group. The OMS Manager in the DS that had been disconnected receives the blocks of sync messages. The DS that had been disconnected uses the blocks of sync messages to bring its state tables and change log into global consistency. The DS that had been disconnected then discards all messages from the OMS group up to and including the sync message as well as deleting the temporary group and resumes normal operation as a part of the main group.

Other embodiments include a computer readable medium having computer to readable code thereon for providing Global Attribute Uniqueness (GAU) using an Ordered Message Service (OMS). The medium includes instructions for receiving a database operation from a client, and instructions for determining if the operation changes a value to a current value. When the operation would change a value to a current value then instructions for ending the operation are executed. The medium also includes instructions such that when the operation would not change a value to a current value the following steps are performed: decomposing the operation into ADD messages and DELETE messages, sending the ADD messages to a GAU manager, checking and updating GAU state, committing updates to GAU state, updating the DS, and returning operation to the client. The medium further includes instructions for sending DELETE messages to the GAU manager and updating GAU state. The updating of GAU state includes deletion of values from at least one GAU table, updating of the change log, and deletion of Fault Recovery Records from the at least one GAU table. The updates are then committed.

Another embodiment includes a computer readable medium having computer readable code thereon for synchronizing directory servers performing Global Attribute Uniqueness (GAU) using an Ordered Messaging Service (OMS). The medium includes instructions for receiving, at an OMS Manager in the DS that had been disconnected, a leader message from an OMS end-point queue indicating communications has been restored and instructions for providing, by the OMS Manager in the Directory Server that had been disconnected, a temporary group through which synchronization with a Leader DS in the main group will occur. The medium further includes instructions for sending, by the OMS Manager in the DS that had been disconnected, a sync message to the OMS group and listening, by the OMS Manager in the DS that had been disconnected, on the temporary group for sync messages. Additionally, the medium includes instructions for receiving, at an OMS Manager of the elected Leader DS, the sync message, and for sending, by the OMS Manager of the elected Leader DS, blocks of change log records as sync messages to the temporary group. The medium further includes instructions for receiving, by the OMS Manager in the DS that had been disconnected, the blocks of sync messages, and instructions for using, in the DS that had been disconnected, the blocks of sync messages to bring its state tables and change log into global consistency. The medium further includes instructions such that the DS that had been disconnected then discards all messages from the OMS group up to and including the sync message as well as deleting the temporary group and resumes normal operation as a part of the main group.

Still other embodiments include a computerized device, configured to process all the method operations disclosed herein as embodiments of the invention. In such embodiments, the computerized device includes a memory system, a processor, communications interface in an interconnection mechanism connecting these components. The memory system is encoded with a process that provides Global Attribute Uniqueness (GAU) using an Ordered Message Service (OMS) and also provides synchronizing directory servers performing GAU using OMS as explained herein that when performed (e.g. when executing) on the processor, operates as explained herein within the computerized device to perform all of the method embodiments and operations explained herein as embodiments of the invention. Thus any computerized devices that perform or are programmed to perform the processing explained herein are embodiments of the invention.

Other arrangements of embodiments of the invention that are disclosed herein include software programs to perform the method embodiment steps and operations summarized above and disclosed in detail below. More particularly, a computer program product is one embodiment that has a computer-readable medium including computer program logic encoded thereon that when performed in a computerized device provides associated operations providing Global Attribute Uniqueness (GAU) using an Ordered Messaging Service (OMS) and also providing the synchronizing the directory servers performing GAU using OMS as explained herein. The computer program logic, when executed on at least one processor with a computing system, causes the processor to perform the operations (e.g., the methods) indicated herein as embodiments of the invention. Such arrangements of the invention are typically provided as software, code and/or other data structures arranged or encoded on a computer readable medium such as an optical medium (e.g., CD-ROM), floppy or hard disk or other a medium such as firmware or microcode in one or more ROM or RAM or PROM chips or as an Application Specific Integrated Circuit (ASIC) or as downloadable software images in one or more modules, shared libraries, etc. The software or firmware or other such configurations can be installed onto a computerized device to cause one or more processors in the computerized device to perform the techniques explained herein as embodiments of the invention. Software processes that operate in a collection of computerized devices, such as in a group of data communications devices or other entities can also provide the system of the invention. The system of the invention can be distributed between many software processes on several data communications devices, or all processes could run on a small set of dedicated computers, or on one computer alone.

It is to be understood that the embodiments of the invention can be embodied strictly as a software program, as software and hardware, or as hardware and/or circuitry alone, such as within a data communications device. The features of the invention, as explained herein, may be employed in data communications devices and/or software systems for such devices such as those manufactured by Sun Microsystems, Inc. of Santa Clara, Calif.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION

Figure 1:
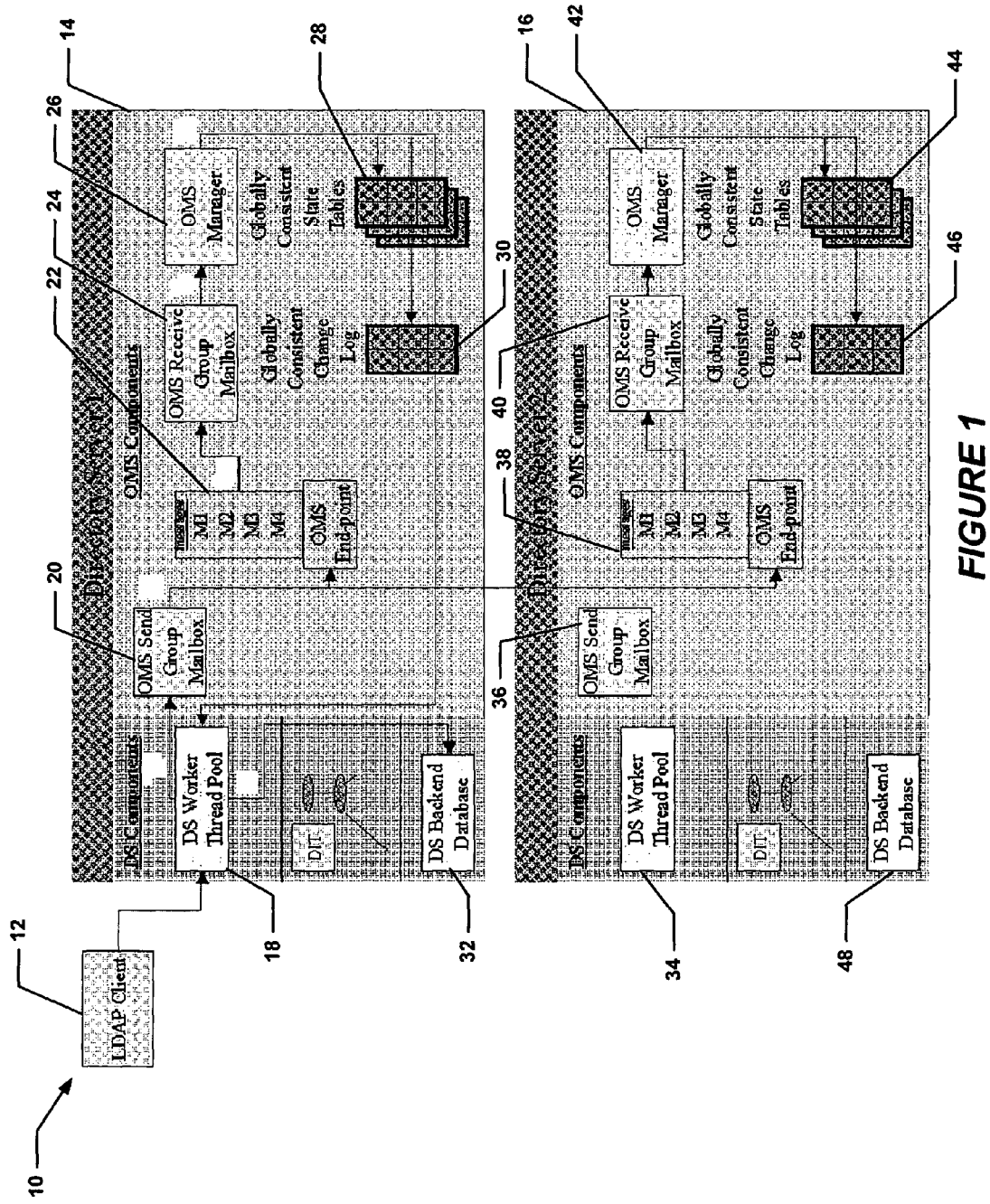
FIG. 1 comprises a block diagram of a particular embodiment for providing Global Attribute Uniqueness (GAU) using an Ordered Message Service (OMS)

A system providing Global Attribute Uniqueness (GAU) using an Ordered Message Service (OMS) includes at least one client in communication with a first Directory Server (DS). The first DS is also in communication with a second DS. A database operation is received from a client at the first DS. A determination is made regarding whether the operation changes a value to a current value. When the operation would change a value to a current value then the operation is ended. When the operation would not change a value to a current value, then the operation is decomposed into ADD messages and DELETE messages. The ADD messages are sent to a GAU manager where a determination is made regarding whether a value already exists and when the value already exists then a status of the message is set to REJECT. When the value does not already exist then values are reserved in at least one GAU table, a change log is updated and a Fault Recovery Record is added to the at least one GAU table.

GAU state is checked and updated. The updates are committed to GAU state and the Directory Server (DS) is updated. Operation is then returned to the client.

DELETE messages are sent to the GAU manager and GAU state is updated. The to updating of GAU state includes deletion of values from at least one GAU table, updating of the change log, and deletion of Fault Recovery Records from the at least one GAU table. The updates are then committed.

The system also provides for synchronization between DSs when one of the DSs has left the group and then rejoins the group. In order to maintain consistency the DS rejoining the group needs to be synchronized with the other DSs. In the system an OMS Manager in the DS that had been disconnected receives a leader message from an OMS end-point queue indicating communications has been restored. The OMS Manager in the DS that had been disconnected provides a temporary group through which synchronization with a Leader DS in the main group will occur. The OMS Manager in the DS that had been disconnected then sends a sync message to the OMS group. Each temporary group name is unique so that multiple disconnected DS serves can synchronize.

The OMS Manager in the DS that had been disconnected listens on the temporary group for sync messages. The OMS Manager of the elected Leader DS receives the sync message and sends blocks of change log records as sync messages to the temporary group. The OMS Manager in the DS that had been disconnected receives the blocks of sync messages and uses the blocks of sync messages to bring its state tables and change log into global consistency.

For performance reasons the disconnected DS sends it's last changelog record number to the synch server in the sync message. The leader than starts at the next record plus some predetermined number in the block. In one implementation one or more block messages are sent in the temporary group; this is efficient to synch a single DS but may starved other DS servers that may be waiting on their temp groups. Alternately, only a single block is sent to a temp group at a time and then the group is closed; this may be slower to synch a single server but allowed other disconnected DS servers to synch also.

The DS that had been disconnected then discards all messages from the OMS group up to and including the sync message as well as deleting the temporary group and resumes normal operation as a part of the main group.

Figure 2:
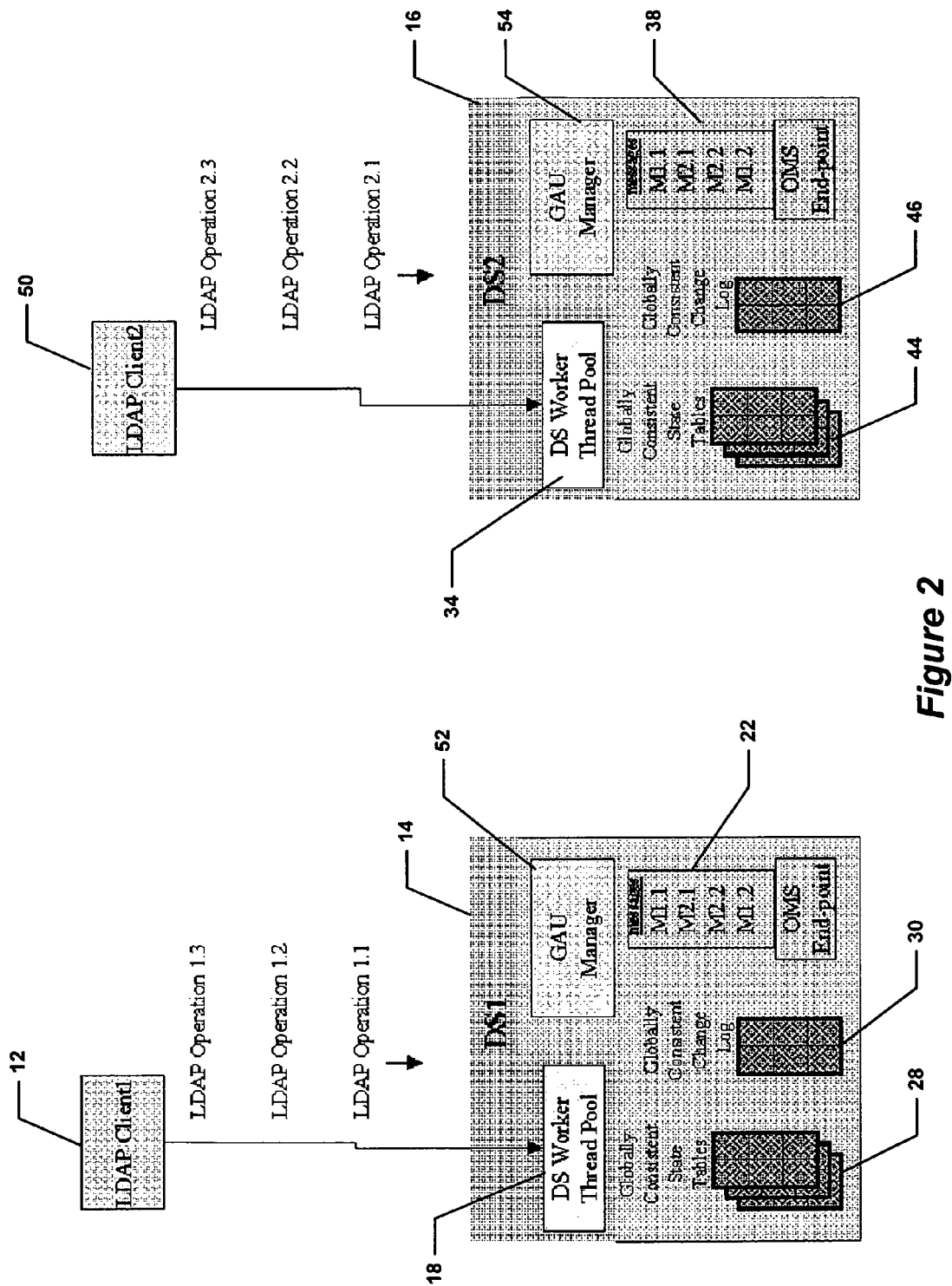
FIG. 2 comprises a block diagram of clients, directory servers and messages used in a particular embodiment for providing GAU using OMS.

Referring now to FIGS. 1 and 2, a particular example of a system for providing Global Attribute Uniqueness (GAU) using an Ordered Messaging Service (OMS) is shown. In this example, a GAU plugin for the DS using an OMS is implemented. The GAU plugin enforces value uniqueness over a set of servers for LDAP Update operations. FIG. 1 shows a general OMS plugin's components along with some of the DS components with which they might interact.

As shown in FIG. 1 the environment 10 includes an LDAP client 12 in communication with a first Directory Server (DS) 14, the first DS 14 in communication with a second DS 16. Each DS 14 and 16 include a respective DS worker thread Pool 18 and 34, respective OMS Send Group Mailboxes 20 and 36 and respective OMS end-point queues 22 and 38. The end-point queues 22 and 38 store messages from all clients in the same order, as a function of the OMS. DS 14 and 16 further include respective OMS Receive Group Mailboxes 24 and 40 and respective OMS managers 26 and 42. The DSs 14 and 16 additionally include respective Globally Consistent State Tables 28 and 44, respective Globally Consistent Change Logs 30 and 46 and respective DS backend databases 32 and 48.

Referring now to FIG. 2, a first LDAP client 12 is shown in communication with a first DS 14. Similarly, a second LDAP client 50 is shown in communication with a second DS 16. First LDAP 12 provides three messages to DS1, namely LDAP operations 1.1, 1.2 and 1.3. Second LDAP 50 also provides three messages to DS 16, namely LDAP operations 2.1, 2.2 and 2.3. While only two DSs and clients, as well as three messages for each client are shown, it should be appreciated that any number of clients, DSs and messages could be used. In each DS 14 and 16, the OMS end-point queues 22 and 38 receive the messages and interleave them in their respective queues 22 and 38. The fact that all messages are interleaved in the same order at each of the OMS End-points is a very powerful abstraction that eases the development of many types of fault tolerant distributed applications without the need for synchronized clocks and timestamps.

In operation, the LDAP client 12 submits a request to a Directory Server (DS1 14) and one of the DS 14 worker threads of DS worker thread pool 18 is assigned to service the request. If the request is intercepted by an OMS-enabled plugin, the worker thread does not immediately service the request but instead sends a message to an OMS Group 20 with details of how to service the request and then waits.

The message is interleaved with all other messages in the same order at each of the OMS End-points in an OMS end-point queue 22. The OMS Receive Group Mailbox 24 gets messages off of the OMS End-point's queue 22 at the request of the OMS Manager 26. The OMS Manager 26 checks its Globally Consistent State Tables 28 to see if the request should be serviced. If it should, the OMS manager 26 updates its Globally Consistent State Tables 28 and puts an entry in its Globally Consistent Change Log 30 to match the request. If the OMS Manager 26 is local to the Worker Thread that sent the message, it wakes up the Worker Thread with the status of the request. If the status indicates that the request should be serviced, the Worker Thread does the required operations in the backend database 32, does any required post processing and then returns success status to the LDAP Client 12. Otherwise the Worker Thread does any required post processing and then returns an error status to the LDAP Client 12.

Figure 3:
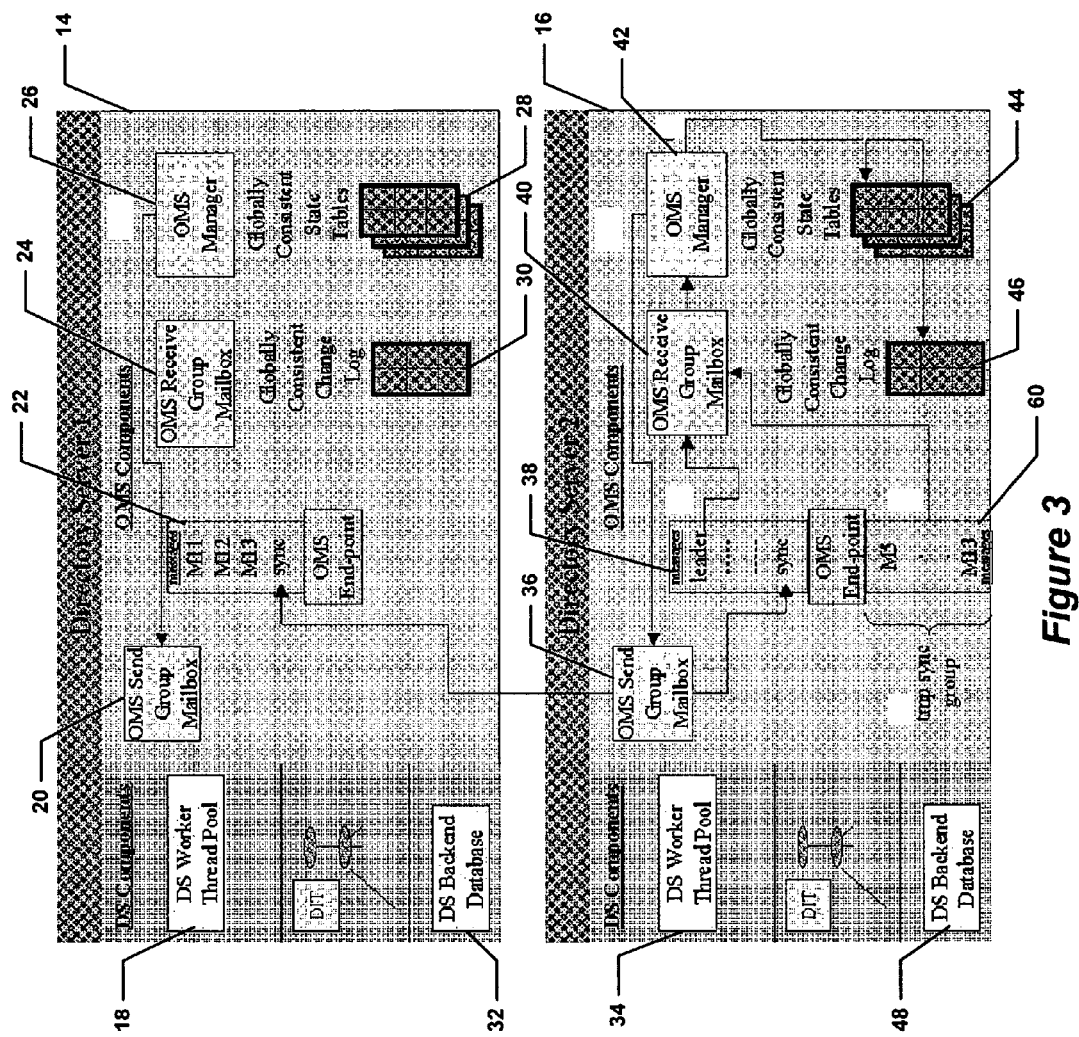
FIG. 3 comprises a block diagram of clients, directory servers and messages used in a particular embodiment for performing synchronization in a system providing GAU using OMS.

Referring now to FIG. 3, a particular example is shown of the synchronization that is followed when a DS loses communications with the main DS group (i.e., the group that includes the elected leader) and then has the communications restored. The OMS Manager 42 in the DS 16 that had been disconnected receives a leader message from the OMS end-point queue 38 which means communications has been restored with the main DS group.

The OMS Manager 42 creates a temporary group 60 through which synchronization with the Leader DS 14 in the main group will occur. The OMS Manager 42 sends a sync message to the OMS group via OMS send group mailbox 36 and then begins listening on the temporary group for sync messages.

The OMS Manager 26 of the Leader DS 14 receives the sync message and begins sending blocks of change log records as sync messages to the temporary group. The OMS Manager 42 in the syncing DS 16 receives the blocks of sync messages and uses them to bring its state tables 44 and change log 46 back into global consistency. Once this is completed, the OMS Manager 42 in the syncing DS discards all messages from the OMS group up to and including the sync message, deletes the temporary group 60 and then resumes normal operation as a part of the main group.

Flow charts of the presently disclosed methods are depicted in FIGS. 4A through 5B. The rectangular elements are herein denoted "processing blocks" and represent computer software instructions or groups of instructions. The diamond shaped elements, are herein denoted "decision blocks," represent computer software instructions, or groups of instructions which affect the execution of the computer software instructions represented by the processing blocks.

Alternatively, the processing and decision blocks represent steps performed by functionally equivalent circuits such as a digital signal processor circuit or an application specific integrated circuit (ASIC). The flow diagrams do not depict the syntax of any particular programming language. Rather, the flow diagrams illustrate the functional information one of ordinary skill in the art requires to fabricate circuits or to generate computer software to perform the processing required in accordance with the present invention. It should be noted that many routine program elements, such as initialization of loops and variables and the use of temporary variables are not shown. It will be appreciated by those of ordinary skill in the art that unless otherwise indicated herein, the particular sequence of steps described is illustrative only and can be varied without departing from the spirit of the invention. Thus, unless otherwise stated the steps described below are unordered meaning that, when possible, the steps can be performed in any convenient or desirable order.

Figure 4A:
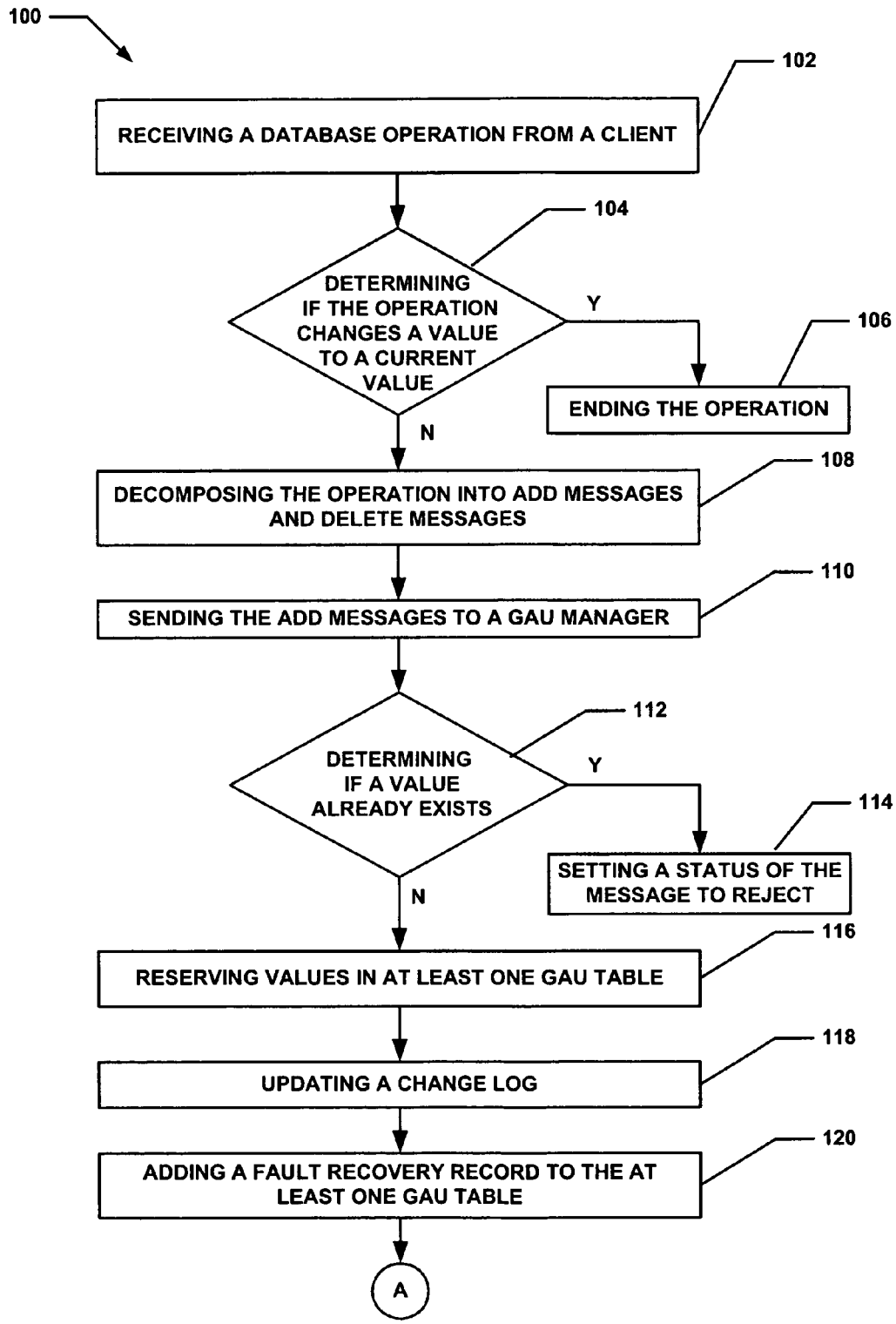
FIGS. 4A and 4B comprises a flow diagram of a particular embodiment of a method for providing GAU using OMS.
Figure 4B:
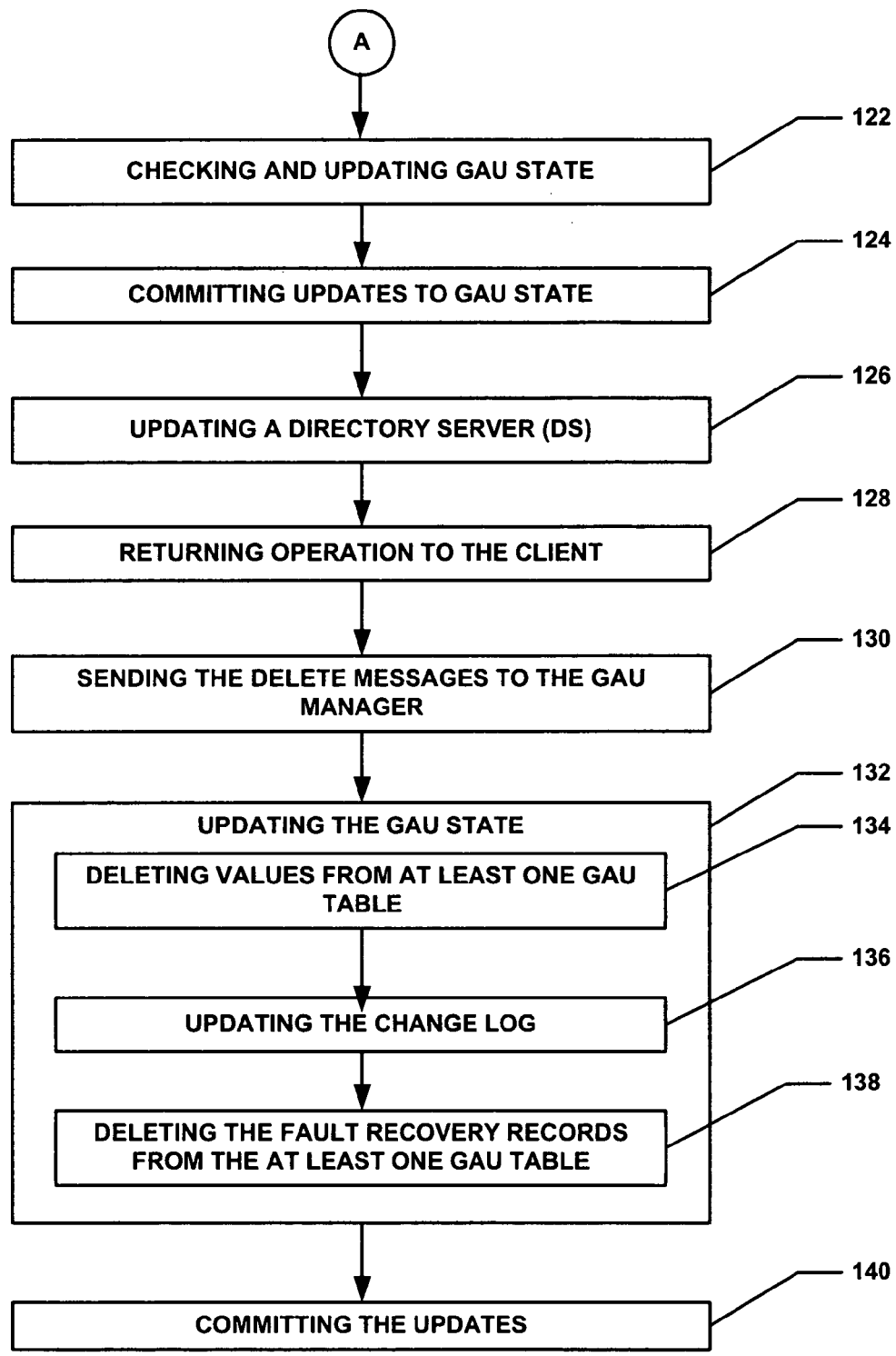

Referring now to FIGS. 4A and 4B, a method 100 of providing Global Attribute Uniqueness (GAU) using an Ordered Message Service (OMS) is shown. The method starts with processing block 102, which discloses receiving a database operation from a client.

Decision block 104 recites determining if the operation changes a value to a current value. When the operation would change a value to a current value then processing continues at processing block 106 which states ending the operation. On the other hand when the operation would not change a value to a current value then processing continues at processing block 108.

Processing block 108 discloses decomposing the operation into ADD messages and DELETE messages. Processing block 110 recites sending the ADD messages to a GAU manager.

Processing continues at decision block 112 which states determining if a value already exists. When the value already exists then processing block 114 is executed which discloses setting a status of the message to REJECT.

When the determination at decision block 112 is that a value does not already exist, processing continues at processing block 116 which recites reserving values in at least one GAU table. Processing block 118 states updating a change log and processing block 120 recites adding a Fault Recovery Record to the at least one GAU table.

Processing continues with processing block 122 which discloses checking and updating GAU state, with processing block 124 which recites committing updates to GAU state, processing block 126 which states updating a Directory Server and processing block 128 which states returning operation to the client.

The method further includes processing block 130 which discloses sending the DELETE messages to the GAU manager. Processing block 132 is executed next, and recites updating the GAU state. Updating the GAU state is performed by executing processing block 134 which states deleting values from at least one GAU table, processing block 136 which discloses updating the change log, and processing block 138 which recites deleting the Fault Recovery Records from the at least one GAU table. The process end with processing block 140 which states committing the updates.

Figure 5A:
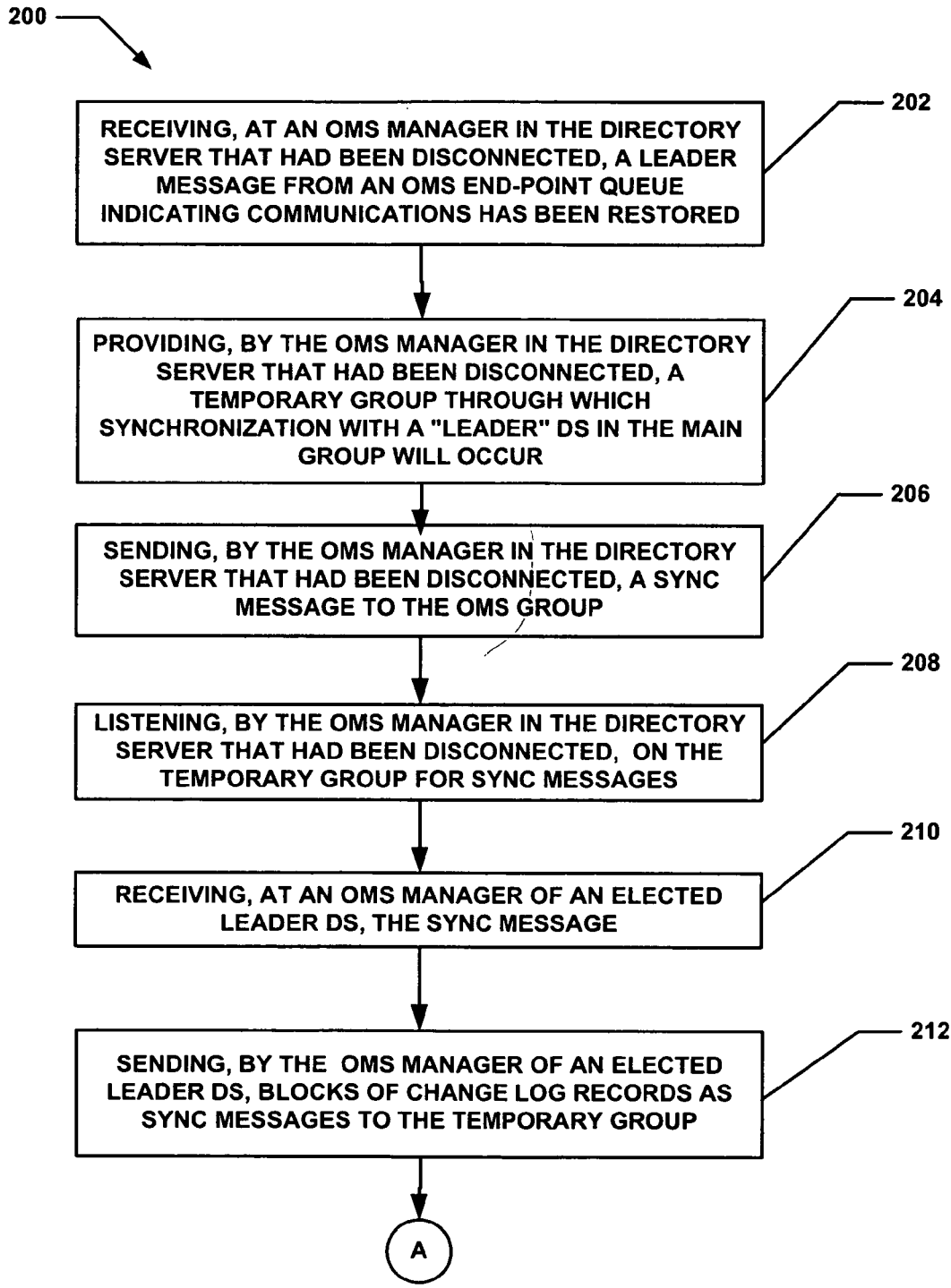
FIGS. 5A and 5B comprises a flow diagram of a particular embodiment of a method for providing synchronization in a system providing GAU using OMS.
Figure 5B:
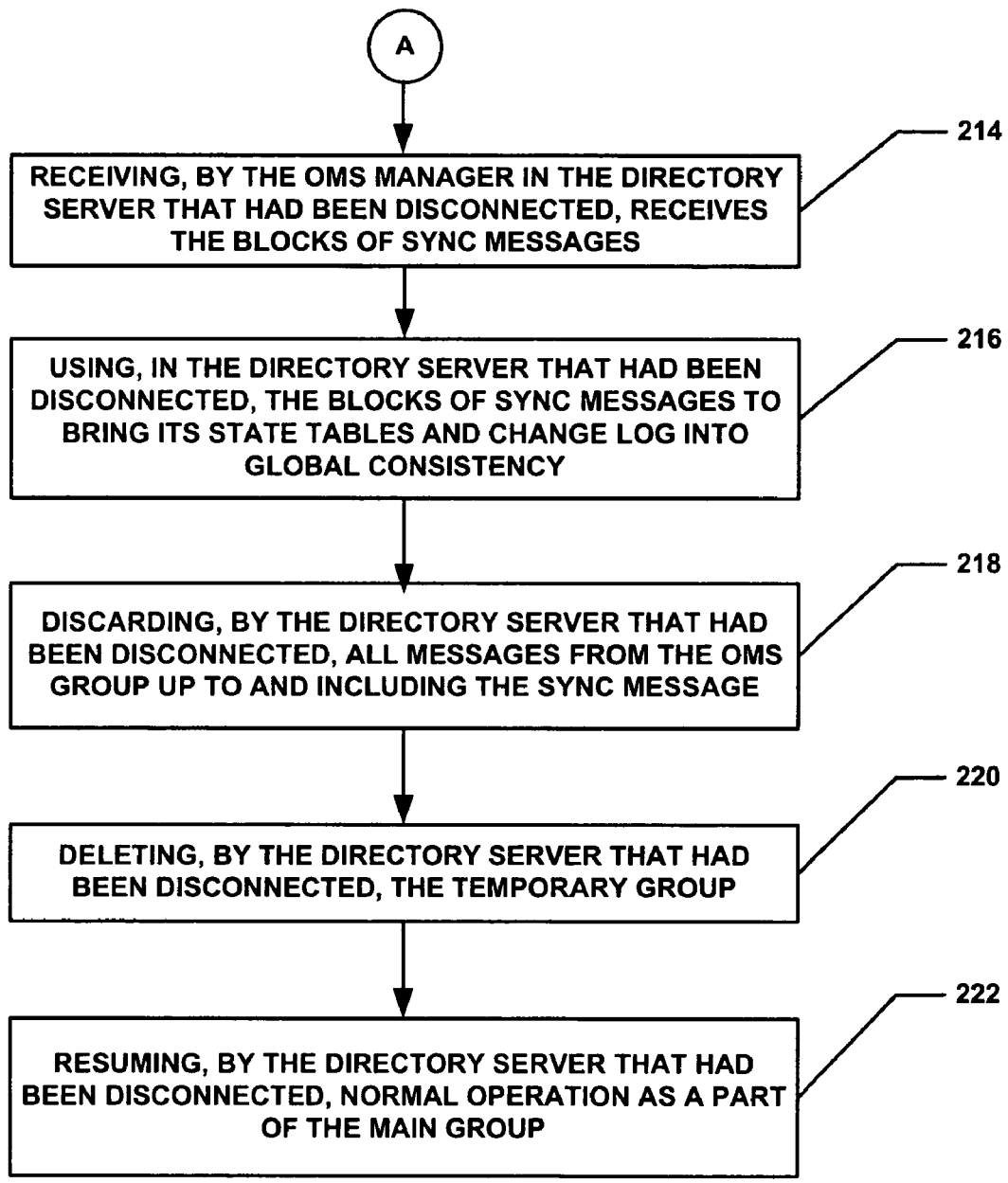

Referring now to FIGS. 5A and 5B, a method of synchronizing directory servers performing Global Attribute Uniqueness (GAU) using an Ordered Messaging Service (OMS) is shown. This method 200 begins with processing block 202 which discloses receiving, at an OMS Manager in the DS that had been disconnected, a leader message from an OMS endpoint queue indicating communications has been restored.

Processing block 204 recites providing, by the OMS Manager in the Directory Server that had been disconnected, a temporary group through which synchronization with a Leader DS in the main group will occur. Execution continues with processing block 206 which states sending, by the OMS Manager in the DS that had been disconnected, a sync message to the OMS group.

Processing block 208 states listening, by the OMS Manager in the DS that had been disconnected, on the temporary group for sync messages, while processing block 210 discloses receiving, at an OMS Manager of the elected Leader DS, the sync message.

Next, processing block 212 is executed. Processing block 212 recites sending, by the OMS Manager of an elected Leader DS, blocks of change log records as sync messages to the temporary group.

Processing block 214 is executed next. Processing block 214 states receiving, by the OMS Manager in the DS that had been disconnected, the blocks of sync messages. Following execution of processing block 214, processing block 216 is performed. Processing block 216 discloses using, in the DS that had been disconnected, the blocks of sync messages to bring its state tables and change log into global consistency.

Processing block 218 recites discarding, by the DS that had been disconnected, all messages from the OMS group up to and including the sync message. Processing block 220 discloses deleting, by the DS that had been disconnected, the temporary group. The process ends with processing block 222 which states resuming, by the DS that had been disconnected, normal operation as a part of the main group.

Having described preferred embodiments of the invention it will now become apparent to those of ordinary skill in the art that other embodiments incorporating these concepts may be used. Additionally, the software included as part of the invention may be embodied in a computer program product that includes a computer useable medium. For example, such a computer usable medium can include a readable memory device, such as a hard drive device, a CD-ROM, a DVD-ROM, or a computer diskette, having computer readable program code segments stored thereon. Accordingly, it is submitted that the invention should not be limited to the described embodiments but rather should be limited only by the spirit and scope of the appended claims.

What is claimed is:

1. A method of synchronizing Directory Servers (DSs) performing Global Attribute Uniqueness (GAU) using an Ordered Messaging Service (OMS), the method comprising:

receiving, at an OMS Manager in a Directory Server that had been disconnected from a main group of Directory Servers (DSs), a leader message from an OMS Endpoint queue indicating communications have been restored;

providing, by said OMS Manager in the DS that had been disconnected, a temporary group through which synchronization with a Leader DS in the main group will occur;

sending, by said OMS Manager in the DS that had been disconnected, a sync message to the OMS group;

listening, by said OMS Manager in the DS that had been disconnected, on the temporary group for sync messages;

receiving, at an OMS Manager of the Leader DS, the sync message;

sending, by said OMS Manager of the Leader DS, blocks of change log records as sync messages to the temporary group;

receiving, by said OMS Manager in the DS that had been disconnected, the blocks of sync messages;

and using, in the DS that had been disconnected, said blocks of sync messages to bring state tables and a change log into global consistency.

2. The method of claim 1 further comprising discarding, by the DS that had been disconnected, all messages from the OMS group up to and including the sync message.

3. The method of claim 2 further comprising deleting, by the DS that had been disconnected, the temporary group.

4. The method of claim 3 further comprising resuming, by the DS that had been disconnected, normal operation as a part of the main group.

5. A computer readable storage medium having computer readable code thereon for synchronizing Directory Servers (DSs) performing Global Attribute Uniqueness (GAU) using an Ordered Message Service (OMS), the medium comprising:

instructions for receiving, at an OMS Manager in a Directory Server (DS) that had been disconnected from a main group of Directory Servers (DSs), a leader message from an OMS End-point queue indicating communications have been restored;

instructions for providing, by said OMS Manager in the DS that had been disconnected, a temporary group through which synchronization with a Leader DS in the main group will occur;

instructions for sending, by said OMS Manager in the DS that had been disconnected, a sync message to the OMS group;

instructions for listening, by said OMS Manager in the DS that had been disconnected, on the temporary group for sync messages;

instructions for receiving, at an OMS Manager of the Leader DS, the sync message;

instructions for sending, by said OMS Manager of the Leader DS, blocks of change log records as sync messages to the temporary group;

instructions for receiving, by said OMS Manager in the DS that had been disconnected, the blocks of sync messages;

and instructions for using, in the DS that had been disconnected, said blocks of sync messages to bring state tables and a change log into global consistency.

6. The computer readable medium of claim 5 further comprising instructions for discarding, by the DS that had been disconnected, all messages from the OMS group up to and including the sync message.

7. The computer readable medium of claim 6 further comprising instructions for deleting, by the DS that had been disconnected, the temporary group.

8. The computer readable medium of claim 7 further comprising instructions for resuming, by the DS that had been disconnected, normal operation as a part of the main group.

* * * * *